United States Patent

Dyck

[15] 3,639,141
[45] Feb. 1, 1972

[54] HEPARINIZATION OF PLASTIC

[72] Inventor: Manfred F. Dyck, North Miami, Fla.
[73] Assignee: Cordis Corporation, Miami, Fla.
[22] Filed: Sept. 16, 1968
[21] Appl. No.: 762,376

[52] U.S. Cl..............117/47 A, 117/138.8 UF, 117/161 ZA, 424/183, 3/1
[51] Int. Cl..........................................................B44d 1/16
[58] Field of Search..................8/30.1, DIG. 1; 117/161 ZA, 117/138.8 UF, 47 A; 424/183; 3/1

[56] References Cited

UNITED STATES PATENTS 3,512,915  5/1970  Speier.............................................8/8
3,475,410  10/1969  Britton..............................424/183 X

OTHER PUBLICATIONS

Falb et al., " Development of Blood Compatible Polymeric Materials," Battelle Memorial Institute, Columbus, Ohio, June 22, 1966, pp. 17– 18.
Union Carbide, " Organofunctional Silanes," 1956, pp. 14– 16.

Primary Examiner—William D. Martin
Assistant Examiner—D. Cohen
Attorney—Kenway, Jenney & Hildreth

[57] ABSTRACT

Plastics are rendered nonthrombogenic by heparinizing them following a treatment with an amino alkyl tri alkoxy silane in an inert solvent. The solvent is preferably one capable of swelling the plastic. In the treatment of fluorocarbon plastics, a preliminary treatment with sodium is employed. The amino groups which become attached to the plastic are thus caused to bond heparin to the surface effectively to impart anticoagulating properties.

2 Claims, No Drawings

HEPARINIZATION OF PLASTIC

This invention is directed to the production of plastics having nonthrombogenic surface characteristics. Plastics of this type are in demand for use in prosthetic and therapeutic apparatus for handling blood under conditions where clotting would tend to occur.

When blood is brought into contact with plastics, glass or other strange surfaces, it tends to clot in a relatively short time unless precautions have been taken to prevent this. One common precaution currently under considerable investigation is the treatment of the surface with heparin, a substance known to have anticoagulant properties when in contact with blood. The presence of heparin on the surface imparts nonthrombogenic characteristics.

I have developed a new and improved method of treating numerous plastics to bond heparin to their surfaces in a very simple and effective manner. In particular my method provides a nonthrombogenic surface in a manner that does not in other ways adversely affect the blood as by increasing hemolysis as will happen in other known methods.

In carrying out my method I make use of the fact that heparin in solution will combine with primary amino groups and form a remarkably stable bond. In this connection it will be noted that heparin is generally considered to be a high-molecular weight (e.g., 16,000) tetrasaccharide which is highly negative on account of sulfate and sulfonate groups capable of bonding with the positive amino groups.

According to this invention the plastic material to be treated is contacted with a solution of an amino alkyl tri alkoxy silane dissolved in an organic solvent which is preferably capable of swelling the plastic, and which is also preferably water miscible. After the plastic has been contacted with the silane solution it is removed and treated with an aqueous solution of heparin, to hydrolyze the trimethoxy group and to cause heparin to be bound to the plastic surface.

Plastics thus treated may be placed in contact with blood and will be found to exhibit greatly prolonged clotting times, depending on the nature of the plastic, the nature of the silane, the amount of amino groups present and the amount of heparin with which it has been caused to react.

My invention is based on the concept of chemically or physically bonding the silane to the plastic preferably by utilizing a solvent which will swell the plastic, and in so doing carry the silane in solution onto it. Treatment of the plastic with an aqueous solution causes hydrolysis of the alkoxy groups to form hydroxy groups. The latter condense with the elimination of water and form a cross linked polymeric structure which is attached to the plastic surface and presents primary amino groups to which the heparin readily bonds.

In the treatment of fluorocarbons such as Teflon it is preferable to contact the surface first with sodium or similar alkali metal in the manner commonly employed in treatments to render the polymer bondable to other materials. This treatment consists generally in a surface application to the plastic of an activated sodium solution which is actually a colloidal dispersion of sodium in a hydrocarbon. The so-called activated sodium solutions are commercially available under such trademarks as "Fluoroetch" Safety Solvent and "Tetraetch" for the purpose of rendering the fluorocarbon plastic bondable by means of adhesive cements.

The sodium treatment serves to modify the surface of the fluorocarbon by causing the formation of a carbonaceous film, and by forming reactive radicals on the plastic surface in place of fluorine atoms. The surface is thus made compatible with the silane, and reactive with the hydroxy groups which effect the actual bonding of the amino groups to the surface.

The following examples set forth representative methods for practicing of this invention.

In each case the plastic was immersed in the silane solution for 2½ hours, then washed in pure solvent and immersed in a heparin solution containing 100 mg. heparin dissolved in a mixture of 7 ml. of distilled water and 5 ml. of methanol for 22 hours. The heparinized plastic was next dried at 50° C. for 3 hours, immersed for 220 hours in distilled water (which was changed 3–4 times per day) flushed with saline solution and filled with fresh bovine blood.

EXAMPLE I

| | |
|---|---|
| Plastic | Silicone rubber tubing 3.5 mm. ID × 4.5 mm. OD × 60 cm. long |
| Treating Solution | 4 grams of N (trimethoxy silyl propyl) ethylene diamine[1] (Dow Corning Z 6020) in 20 ml. tetrahydrofurane |
| Clotting time | Over 13 days |

EXAMPLE II

| | |
|---|---|
| Plastic | Teflon (polytetrafluoroethylene) 3.5 mm. 4 mm. OD × 60 cm. long |
| Solution | First 60-second dip in activated sodium solution (Fluoroetch) Second 2½-hour immersion in 4 ml. Z 6020 10 ml. toluene 10 ml. tetrahydrofurane |
| Clotting time | Over 8 days |

EXAMPLE III

| | |
|---|---|
| Plastic | Polyvinyl chloride |
| Solution | 4 g. of Z 6020 in 20 ml. acetone |

[1] also known as N-β-aminoethyl-α-aminopropyl trimethoxy silane

EXAMPLE IV

| | |
|---|---|
| Plastic | Polyurethane |
| Solution | 4 g. of Z 6020 in 20 ml. methylethylketone |

Although this invention has been described with reference to specific plastics, solvents and silanes it is contemplated that obvious modifications will readily occur to those skilled in general, the process may be practiced with other organic polymers by treatment with a silane dissolved in a solvent. Those skilled in the art are well familiar with these techniques concerning the effects of solvent-type liquids on organic polymers. Water miscible solvents are preferred, but ones not of themselves water miscible may be used, either mixed with water miscible solvents, or in a step followed by application of an intermediate solvent with which both it and water are miscible.

At present the preferred silane has been Dow Z 6020, but it is contemplated that others of the general formula

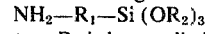

$$NH_2-R_1-Si(OR_2)_3$$

$R_1$ is organic structure $R_2$ is lower alkyl or phenyl would be equally effective. It is known that the $OR_2$ groups readily hydrolyze to OH groups which will react in the manner described, and that $NH_2$ groups readily bond with heparin. It is accordingly believed evident that numerous compounds of this type are suitable. In particular γ-aminopropyl triethoxy silane also as trimethoxy silane N-(dimethoxy methyl silyl isobutyl)-ethylene diamine Bis (β-hydroxyethyl)γ-aminopropyl triethoxy silane Having thus disclosed my invention and described in detail a preferred embodiment thereof I claim and desire to secure by Letters Patent:

1. The method of treating a fluorocarbon plastic to impart nonthrombogenic properties which comprises first contacting said plastic with sodium, thereafter contacting said plastic with an amino alkyl tri alkoxy silane solution in an organic solvent and thereafter contacting said plastic with water and heparin to cause hydrolysis of said silane and bonding thereto of heparin.

2. The method defined by claim 1 wherein the silane is $(CH_3)_3 Si (CH_2)_3 NH (CH_2)_2 NH_2$.

* * * * *

PO-1050
(5/69)

UNITED STATES PATENT OFFICE
CERTIFICATE OF CORRECTION

Patent No. 3,639,141            Dated February 1, 1972

Inventor(s) Manfred F. Dyck

It is certified that error appears in the above-identified patent and that said Letters Patent are hereby corrected as shown below:

Column 4, line 4, Claim 2, "$(CH_3)_3$" should read --$(CH_3O)_3$--.

Signed and sealed this 18th day of July 1972.

(SEAL)
Attest:

EDWARD M. FLETCHER, JR.            ROBERT GOTTSCHALK
Attesting Officer                        Commissioner of Patents